United States Patent
Wu et al.

(10) Patent No.: US 9,532,205 B2
(45) Date of Patent: Dec. 27, 2016

(54) METHOD AND SYSTEM FOR IDENTIFYING APPLICATION DETECTION AND CONTROL FUNCTION MODE

(71) Applicant: ZTE Corporation, Shenzhen, Guangdong (CN)

(72) Inventors: Jinhua Wu, Shenzhen (CN); Xiaoyun Zhou, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 81 days.

(21) Appl. No.: 14/375,024

(22) PCT Filed: Jan. 22, 2013

(86) PCT No.: PCT/CN2013/070852
§ 371 (c)(1),
(2) Date: Jul. 28, 2014

(87) PCT Pub. No.: WO2013/113263
PCT Pub. Date: Aug. 8, 2013

(65) Prior Publication Data
US 2015/0036550 A1 Feb. 5, 2015

(30) Foreign Application Priority Data
Jan. 30, 2012 (CN) .......................... 2012 1 0021069

(51) Int. Cl.
*H04W 8/02* (2009.01)
*H04L 12/14* (2006.01)
(Continued)

(52) U.S. Cl.
CPC ............ *H04W 8/02* (2013.01); *H04L 12/1407* (2013.01); *H04L 41/0893* (2013.01); *H04M 15/66* (2013.01); *H04L 43/028* (2013.01)

(58) Field of Classification Search
CPC .. H04L 12/2602; H04L 12/1407; H04L 63/20; H04L 63/102; H04L 47/2483; H04L 43/028; H04L 41/5019; H04L 47/20; H04L 12/407; H04L 41/0893; H04M 15/66; H04W 76/022; H04W 8/02
See application file for complete search history.

(56) References Cited

U.S. PATENT DOCUMENTS

2012/0220330 A1* 8/2012 Goldner .............. H04L 12/1407
455/517
2012/0239816 A1* 9/2012 Carnero Ros ......... H04M 15/66
709/227
(Continued)

FOREIGN PATENT DOCUMENTS

CN 101867977 A 10/2010
CN 102111740 A 6/2011
(Continued)

OTHER PUBLICATIONS

3rd Generation Partnership Project, Technical specification Group Services and System Aspects, Policy and charging control architecture (Release 11)—3GPP TS 23.203 v11.4.0 (Dec. 2011); Dec. 2012; pulished by 3rd Generation Partnership Project; perinent pp. 19-20, 78-79, and 153-154.*
(Continued)

*Primary Examiner* — Yee Lam
(74) *Attorney, Agent, or Firm* — Oppedahl Patent Law Firm LLC

(57) ABSTRACT

A method for identifying an Application Detection Control (ADC) function mode is disclosed. The method is applicable to a scenario where a roaming UE accesses a visited network from a visited location, and includes that: when a Visit Policy And Charging Rule Function entity (V-PCRF) creates an S9 session, the V-PCRF informs a Home Policy And Charging Rule Function entity (H-PCRF) of an ADC (ADC) function mode supported by a visited network; and the H-PCRF determines, in accordance with the ADC function mode supported by the visited network, whether to provide
(Continued)

the ADC rule to the visited network. A system for identifying an ADC function mode is disclosed. With the method and the system, when a user is in a visited access scenario, a network system can perform a correct application detection function on the user.

7 Claims, 5 Drawing Sheets

(51) Int. Cl.
*H04L 12/24* (2006.01)
*H04L 12/26* (2006.01)
*H04M 15/00* (2006.01)

(56) References Cited

U.S. PATENT DOCUMENTS

| | | | |
|---|---|---|---|
| 2013/0097325 A1* | 4/2013 | Mann | H04W 76/022 709/227 |
| 2014/0317300 A1* | 10/2014 | Ludwig | H04W 76/064 709/226 |
| 2015/0172471 A1* | 6/2015 | Castro Castro | H04M 15/66 370/329 |
| 2015/0236862 A1* | 8/2015 | Castro Castro | H04L 43/0876 370/259 |

FOREIGN PATENT DOCUMENTS

| | | |
|---|---|---|
| CN | 102655634 A | 9/2012 |
| CN | 102655636 A | 9/2012 |

OTHER PUBLICATIONS

3GPP tsg-ct WG3 Meeting #68, Capability negotiation of solicited and unsolicited reporting mode in the roaming case, ZTE, Xiamen, China, Feb. 10, 2012.

3GPP TS 23.203 V11.4.0, 3rd Generation Partnership Project; Technical Specification Group Services and System Aspects; Policy and charging control architecture (Release 11), Dec. 31, 2011.

3GPP TS 29.215 V11.3.0, 3rd Generation Partnership Project; Technical Specification Group Core Network and Terminals; Policy and Charging Control (PCC) over S9 reference point; Stage 3 (Release 11), Dec. 2011.

English Translation of the Written Opinion of the International Search Authority in international application No. PCT/CN2013/070852, mailed on May 2, 2013.

International Search Report in international application No. PCT/CN2013/070852, mailed on May 2, 2013.

Supplementary European Search Report in European application No. 13743924.6, mailed on Sep. 4, 2015.

\* cited by examiner

METHOD AND SYSTEM FOR IDENTIFYING APPLICATION DETECTION AND CONTROL FUNCTION MODE

TECHNICAL FIELD

The disclosure relates to the field of policy and charging control technology for mobile communications, and in particular to a method and system for identifying an Application Detection and Control (ADC) function mode.

BACKGROUND

Since the publication of a 3rd Generation Partnership Project Release 7 (3GPP Release7) standard system, a policy and charging function has been implemented by a Policy and Charging Control (PCC) Framework. The PCC Framework is a functional framework that can be used for multiple access technologies, for example: the PCC Framework can be used for Terrestrial Radio Access Networks (UTRANs) on the Universal Mobile Telecommunications System (UMTS), radio access networks and Intercommunication Wireless LANs (I-WLANs) on the Global System for Mobile Communication (GSM)/Enhanced Data Rate for GSM Evolution (EDGE), Evolved Packet Systems (EPSs) and the like.

The PCC mainly implements two major functions of policy control and charging. FIG. 1 is a schematic diagram illustrating a non-roaming architecture of existing PCC of Rel-11. The functionalities of individual logic functions and their interfaces within the PCC architecture shown in FIG. 1 are described as follows.

An Application Function (AF), which is used to provide an access point for service applications, where dynamic policy control is required to be performed on network resources used by these service applications. When conducting parameter negotiation on a service plane, the AF transfers related service information to a Policy and Charging Rules Function (PCRF). If these service information is consistent with the policy of the PCRF, then the PCRF accepts the negotiation. If these service information is consistent with the policy of the PCRF, then the PCRF rejects the negotiation and provides PCRF-acceptable service parameters during feedback. Then, the AF may return these parameters to a User Equipment (UE). Here, the interface between the AF and the PCRF is a Rx interface.

The PCRF is the core of the PCC, and is used to formulate policy decisions and charging rules. The PCRF provides a network control rule based on service data traffic. Such network control includes detection of the service data traffic, gating control, Quality of Service (QoS) control, and a data-traffic-based charging rule. The PCRF sends the policy and charging rule formulated by the PCRF to a Policy and Control Enforcement Function (PCEF) for enforcement. At the same time, the PCRF also needs to ensure consistency between these rules and user profile information. The basis for the PCRF to formulate the policy and charging rules includes: service-related information obtained from the AF, policy control and charging related user policy charging control profile information obtained from a Subscription Profile Repository (SPR), and information of a bearer-related network obtained from PCEF through a Gx interface.

The PCEF is generally located in a Gate-Way (GW) to carry out PCRF-developed policy and charging rules on a bearing plane. The PCEF detects the service data traffic in accordance with a service data traffic filter in the rules sent by PCRF, thereby carrying out PCRF-developed policy and charging rules on these service data traffic. When bearer is established, the PCEF performs resource allocation according to the rules sent by the PCRF, and performs the gating control in accordance with the information provided by the AF. At the same time, the PCEF triggers and reports an event occurred on the bearer network according to an event subscribed by the PCRF, In accordance with the charging rules sent by the PCRF, the PCEF carries out a corresponding service data traffic charging operation. The charging may be either online or offline. In the case of the online charging, the PCEF needs to perform credit management together with an Online Charging System (OCS). In the case of the offline charging, related charging information is exchanged between the PCEF and an Offline Charging System (OFCS). Here, the interface between the PCEF and the PCRF is a Gx interface, the interface between the PCEF and the OCS is a Gy interface, and the interface between the PCEF and the OFCS is a Gz interface. The PCEF may also be enhanced to have a Traffic Detection Function (TDF). The PCEF may perform application detection in accordance with locally configured or PCRF-issued ADC rules including Application Detection and Control (ADC) policies, and perform policy enforcement (such as gating control, redirection and bandwidth limitation). The PCEF is generally located on a gateway of the network, such as a Packet Data Network Gateway (PDN-GW) of the EPS, a GPRS Gateway Support Node (GGSN) in General Packet Radio Service (GPRS), and a Packet Data Gateway (PDG) in an Interworking WLAN (I-WLAN).

The TDF may also be deployed independently. In this case, the TDF is connected with the PCRF through an Sd interface, and may perform application detection and policy enforcement according to preconfigured or PCRF-issued ADC rules. The PCRF provides the TDF with the ADC rules, or activates TDF preconfigured rules. Policy control enforcement operations of an independent TDF function include the gating control, the redirection and the bandwidth limitation. The TDF reports related events and information of detected services/traffics to the PCRF, for example, the TDF reports beginning and ending of the detected services/traffics to the PCRF, sends service data traffic descriptions to the PCRF, and transfers signaling of service detection and policy rules coming from the PCRF and being used for traffic detection.

A Bearer Binding and Event Reporting Function entity (BBERF) is generally located in an access network gateway. For example, when a User Equipment accesses an EPS through an E-UTRAN and a Proxy Mobile Internet Protocol version 6 (PMIPv6) is used between a Serving Gateway (S-GW) and a Packet Gateway (P-GW), the BBERF exists in the S-GW. When the User Equipment accesses through a trusted non-3GPP access network, the BBERF also exists in the trusted non-3GPP access gateway.

User policy charging control profile information related to policy control and charging is stored in the Subscription Profile Repository (SPR). The interface between the SPR and the PCRF is an Sp interface.

The OCS and the PCEF work together to accomplish user credit control and management in the online charging mode.

The OFCS and the PCEF work together to accomplish a charging operation in the offline charging mode.

The above PCC architecture, through individual function entities, accomplishes policy charging control over an IP Connectivity Access Network (IP-CAN) session that the UE establishes to access a Packet Data Network (PDN).

In the prior art, the PCEF-enhanced ADC function supports a solicited report mode, and an independent TDF supports both solicited report and unsolicited report modes.

In the solicited report mode, the PCRF will issue ADC rules to the PCEF/TDF of enhanced ADC or activate pre-defined rules on the PCEF/TDF of enhanced ADC, and inform the PCEF/TDF of enhanced ADC about which services need to be detected and reported to the PCRF.

In the unsolicited report mode, ADC rules are preconfigured and which services needing to be detected and reported is predefined in TDF. It is assumed in the unsolicited report mode that a user agrees that no solicitation is required, and the unsolicited report mode is enforceable without requiring activation of the PCRF.

However, the prior art has not solved the following problems: when the UE roams and is in a visited access scenario, such as the scenario shown in FIG. 2, how a Home Policy and Charging Rule Function (H-PCRF) will distinguish the ADC mode (whether it is the ADC function for the solicited report mode or the unsolicited report mode) of a Visited Public Land Mobile Network (VPLMN), and the H-PCRF cannot make the right decision according to the ADC mode of the VPLMN: whether it is necessary to transfer ADC rules to a Visit Policy and Charging Rule Function (V-PCRF) through the S9 interface; the VPLMN that supports a different ADC mode from a Home Public Land Mobile Network (HPLMN) cannot correctly perform the ADC function on the UE to detect and report application information, that is, when the UE roams to a visited network and is in the visited access scenario, the HPLMN and the VPLMN cannot correctly make decisions and perform the ADC function.

How to enable the H-PCRF to correctly distinguish the ADC mode of the VPLMN, so as to make the right decisions and correctly perform the ADC function has become a problem to be solved by the disclosure.

SUMMARY

In view of this, the disclosure provides a method and system for identifying an ADC function mode, so that a network system can correctly perform the application detection function on a user when the user is in a visited access scenario.

To this end, a technical solution of the disclosure is implemented as follows.

A method for identifying an Application Detection Control (ADC) function mode is applied to a scenario where a roaming UE accesses a visited network from a visited location, and includes that:

when a Visit Policy and Charging Rules Function (V-PCRF) creates an S9 session, the V-PCRF informs a Home Policy and Charging Rules Function (H-PCRF) of an ADC function mode supported by a visited network; and the H-PCRF determines whether to provide an ADC rule to the visited network in accordance with the ADC function mode supported by the visited network.

Further, the ADC function mode may be a solicited application reporting mode or an unsolicited application reporting mode.

Further, when the visited network supports the solicited application reporting mode, the operation that the V-PCRF informs an H-PCRF of an ADC function mode supported by a visited network, and the H-PCRF determines whether to provide an ADC rule to the visited network in accordance with the ADC function mode supported by the visited network may include that:

the V-PCRF informs, through an S9 session establishment indication message, the H-PCRF that the visited network supports the solicited application reporting ADC function mode; and the H-PCRF sends the ADC rule to the V-PCRF through an S9 session establishment acknowledgement message.

Further, after the H-PCRF provides the ADC rule to the V-PCRF, the method may include that:

the V-PCRF forwards the ADC rule to a Policy and Control Enforcement Function entity (PCEF) or a Traffic Detection Function entity (TDF).

Further, when the visited network supports the unsolicited application reporting mode, the operation that the V-PCRF informs an H-PCRF of an ADC function mode supported by a visited network, and the H-PCRF determines whether to provide an ADC rule to the visited network in accordance with the ADC function mode supported by the visited network may include that the V-PCRF informs, through an S9 session establishment indication message, the H-PCRF that the visited network supports the unsolicited application reporting ADC function; and the H-PCRF sends an S9 session establishment acknowledgement message including no ADC rule to the V-PCRF.

A system for identifying an Application Detection Control (ADC) function mode is also provided in the disclosure, which includes:

a notification module, which is located in a Visit Policy and Charging Rules Function (V-PCRF), and is configured to inform a Home Policy and Charging Rules Function (H-PCRF) of an ADC function mode supported by a visited network when an S9 session is created; and an identification response module, which is located in the H-PCRF and is configured to determine, in accordance with the ADC function mode supported by the visited network, whether to provide an ADC rule to the visited network.

Further, the ADC function mode is a solicited application reporting mode or an unsolicited application reporting mode.

Further, when the visited network supports the solicited application reporting ADC function mode, the notification module may be configured to inform, through an S9 session establishment indication message, the H-PCRF that the visited network supports the solicited application reporting ADC function mode; and the identification response module may be configured to send, through an S9 session establishment acknowledgement message, the ADC rule to the V-PCRF.

Further, the system may also include:

a forwarding module, which is located in the V-PCRF, and is configured to forward the ADC rule to a Policy and Control Enforcement Function entity (PCEF) or a Traffic Detection Function entity (TDF) after the notification module provides the ADC rule to the V-PCRF.

Further, when the visited network supports the unsolicited application reporting ADC function mode, the notification module may be configured to inform, through an S9 session establishment indication message, the H-PCRF that the visited network supports the unsolicited application reporting ADC function mode; and the identification response module may be configured to send an S9 session establishment acknowledgement message including no ADC rule to the V-PCRF.

A system for identifying an ADC function mode is also provided in the disclosure, which includes:

a V-PCRF, which is configured to, when the V-PCRF creates an S9 session, inform an H-PCRF of an ADC function mode supported by a visited network, wherein the ADC function mode is a solicited application reporting mode or an unsolicited application reporting mode; and the H-PCRF, which is configured to determine, in accordance with the ADC function mode supported by the visited network, whether to provide an ADC rule to the visited network.

Further, the ADC function mode may be a solicited application reporting mode or an unsolicited application reporting mode.

When the visited network supports the solicited application reporting ADC function mode, the V-PCRF is configured to inform, through an S9 session establishment indication message, the H-PCRF that the visited network supports the solicited application reporting ADC function mode; and the H-PCRF is configured to send, through an S9 session establishment acknowledgement message, the ADC rule to the V-PCRF.

Further, the V-PCRF may be further configured to forward the ADC rule to a PCEF or a TDF.

Further, when the visited network supports the unsolicited application reporting ADC function mode, the V-PCRF is configured to inform, through an S9 session establishment indication message, the H-PCRF that the visited network supports the unsolicited application reporting ADC function mode; and the H-PCRF is configured to send an S9 session establishment acknowledgement message including no ADC rule to the V-PCRF.

A V-PCRF is also provided in the disclosure, which is the V-PCRF according to any one of claims 11 to 15.

An H-PCRF is also provided in the disclosure, which is the H-PCRF according to any one of claims 11 to 15.

In the disclosure, when a V-PCRF creates an S9 session, the V-PCRF informs an H-PCRF of an ADC function report mode supported by a visited network; the ADC function report mode includes a solicited application reporting mode and an unsolicited application reporting mode; and the H-PCRF determines, in accordance with the ADC function report mode supported by the V-PCRF, whether to provide an ADC rule to the V-PCRF. Through the disclosure, the H-PCRF can correctly distinguish the ADC mode of the VPLMN in a visited access scenario, so as to correctly make a decision and perform the ADC function.

DETAILED DESCRIPTION

The technical solution of the disclosure is further elaborated below in combination with the drawings and specific embodiments, so that those skilled in the art can better understand and implement the disclosure. However, the embodiments listed herein are not intended to restrict the disclosure.

The basic idea of the disclosure is that: when a V-PCRF creates an S9 session, the V-PCRF informs an H-PCRF of an ADC function mode supported by a visited network; and the H-PCRF determines, in accordance with the ADC function mode supported by the visited network, whether to provide an ADC rule to the visited network.

The disclosure is elaborated below in accordance with the drawings and specific embodiments.

Embodiment 1

When a user roams into local routing access, the processing of solicited report and unsolicited report between a PCEF/TDF for enhanced ADC policies of an H-PCRF and an HPLMN is the same as that for non-roaming scenario. No description is provided by examples here.

When the roaming UE accesses a visited network from a visited location and both the H-PCRF and the V-PCRF support the ADC function, a support feature cell is used to describe its supported functions at an S9 interface. For example, for the ADC function, when a visited network supports the solicited application reporting ADC function, the ADC rule generated by the H-PCRF will be transferred to the V-PCRF through the S9 interface, and the V-PCRF will forward the ADC rule to the PCEF of enhanced ADC function for installation and enforcement. The corresponding application detection and control information generated during the subsequent detection process will also be transferred back to the H-PCRF via the V-PCRF through the S9 interface.

Figure 1:
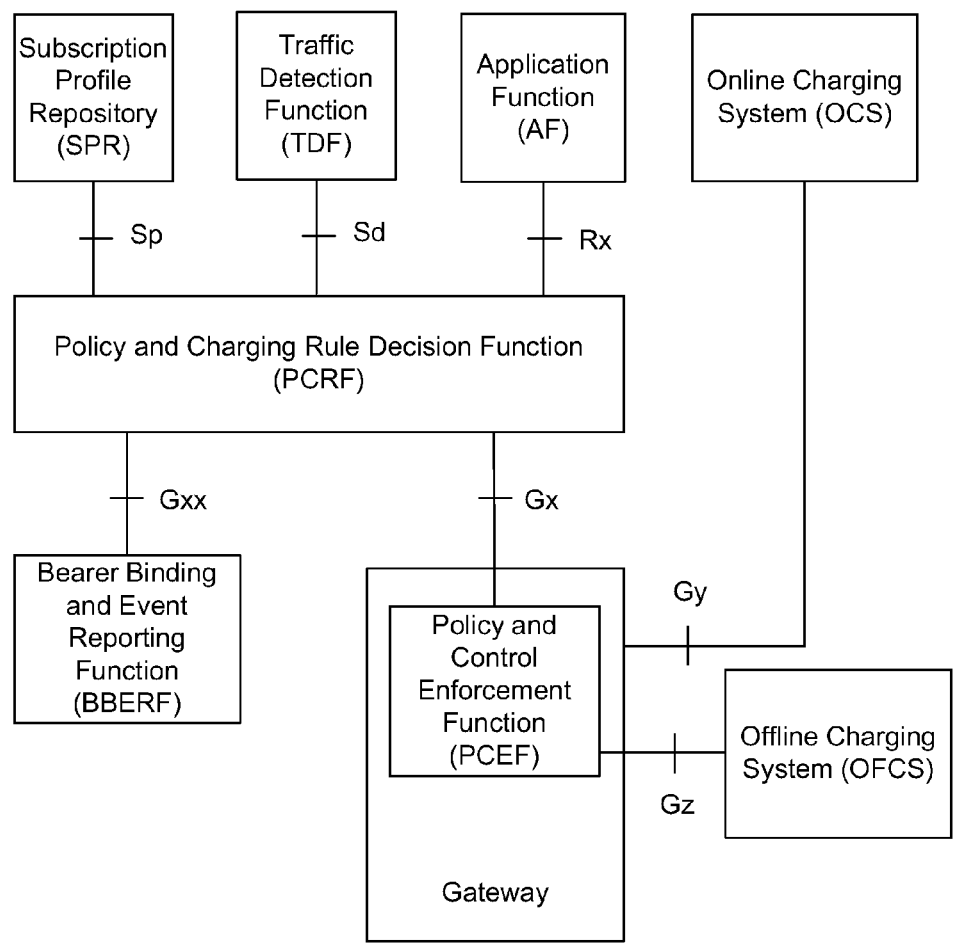
FIG. 1 is a schematic diagram illustrating a PCC non-roaming architecture according to related technologies.
Figure 2:
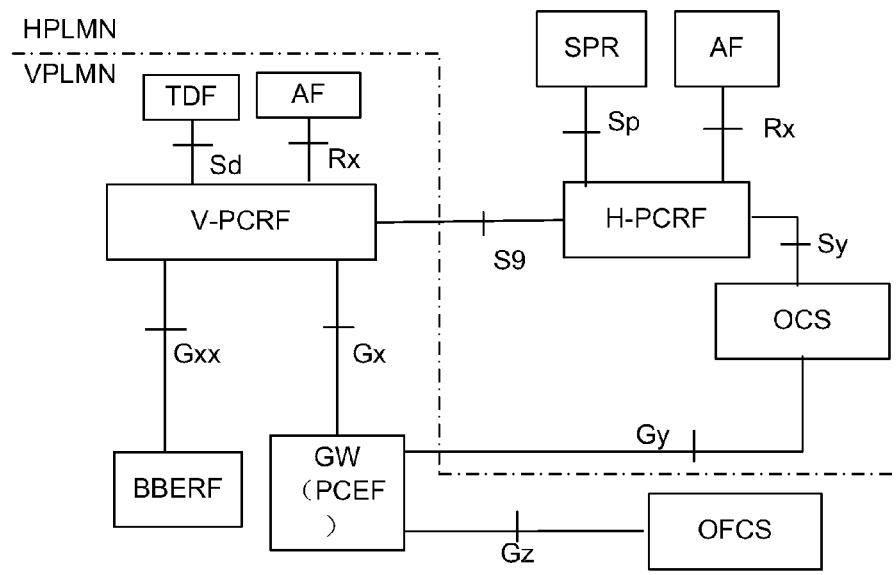
FIG. 2 is a schematic diagram illustrating a PCC roaming visited access architecture according to related technologies.
Figure 3:
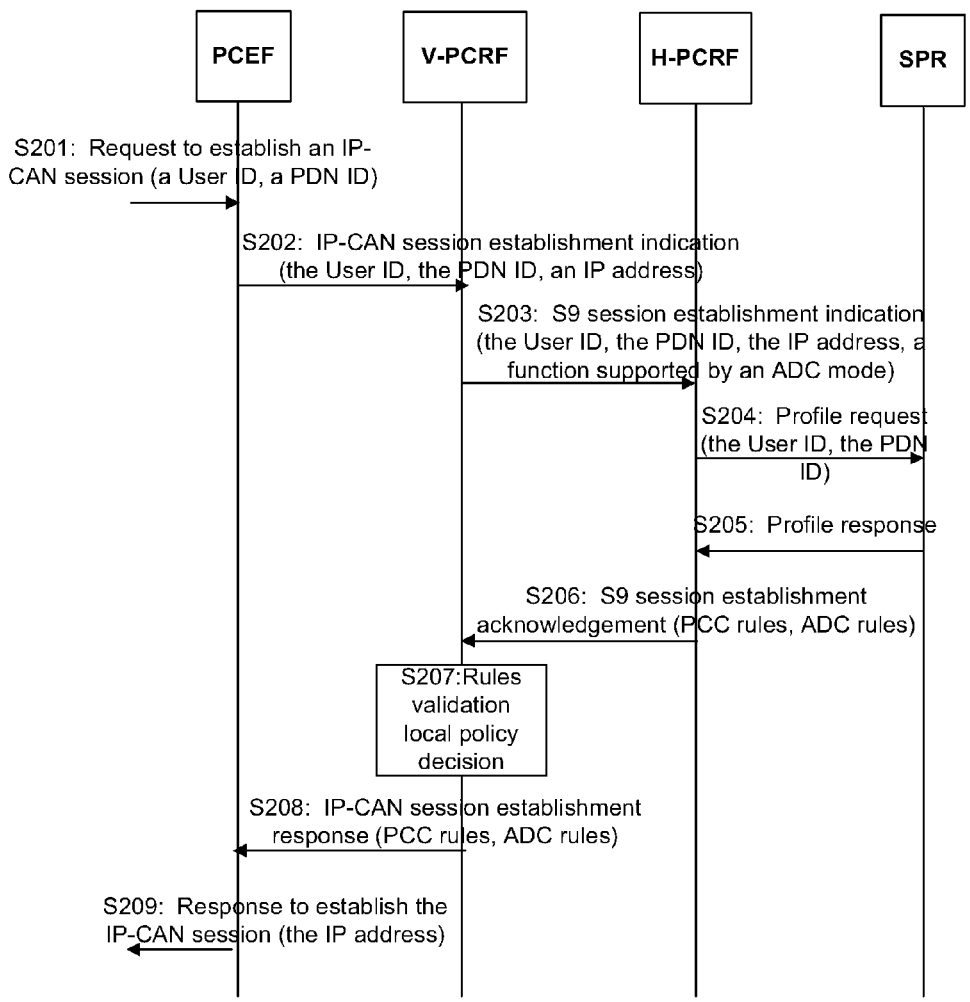
FIG. 3 is a flowchart in accordance with a first embodiment of the disclosure: a process for creating an S9 session when it roams into visited access, with PCEF integrated ADC deployment under ADC mode of solicited mode.

FIG. 3 is a flowchart according to a first embodiment of the disclosure. Here, a roaming UE is in the visited access mode, no S9 session has been established between the visited and roaming places, a PCEF has enhanced the ADC function, and solicited application reporting ADC function mode is adopted. As shown in FIG. 3, the specific description of the process is as follows:

Step S201: During the process that the UE requests to establish an IP-CAN session, a gateway where the PCEF is located receives an IP-CAN session establishment request message, and carries the user ID and the PDN ID of a PDN network requesting to be accessed in the IP-CAN session establishment request message.

Step S202: The PCEF sends an IP-CAN session establishment indication message to the V-PCRF, and carries the user ID, the PDN ID and an IP Address allocated to the UE in the IP-CAN session establishment indication message.

Moreover, the PCEF carries the value of ADC in a supported feature cell to indicate the V-PCRF that the PCEF supports the ADC function. In general, the PCEF only supports the solicited application reporting ADC function mode.

Step S203: The V-PCRF determines, according to the user ID, that the user is a roaming user. If the V-PCRF has not yet established any S9 session for the user, then the V-PCRF sends a request message, which may be a Credit Control Request (CCR) message, to the H-PCRF to establish an S9 session, and at the same time also requests to establish an S9 sub-session, in which the V-PCRF carries profile information of the user, the PDN ID, the IP address and the like. If the V-PCRF supports the ADC function (including both unsolicited application reporting or solicited application report) and the PCEF supports the solicited application reporting mode, then the V-PCRF carries a value indicating the solicited application reporting ADC function in the support feature carried in the request message. The V-PCRF is intended to inform the H-PCRF of the type of the ADC function mode supported by the visited network, where the specific method is not restricted in the disclosure.

Step S204: The H-PCRF determines, according to the user ID, that there is still no profile data of the user, and the H-PCRF sends a profile request to an SPR, and carries the user ID and the PDN ID in the profile request.

Step S205: The SPR returns the user profile information, i.e., profile response according to the user ID and the PDN ID.

At this moment, if the home SPR has not yet provided the H-PCRF with any user profile configuration document, then the home SPR will provide the H-PCRF with a user profile configuration document to inform the H-PCRF about whether the ADC function of the user is contracted and available. Alternatively, the H-PCRF will interact with the SPR upon startup of the equipment to acquire the user profile configuration document.

Step S206: The H-PCRF formulates, according to the returned user profile information, network policy, access information of the UE and the like, a policy which includes a PCC rule, an event trigger and usage monitoring, and returns the formulated policy to the V-PCRF.

If the H-PCRF supports the solicited application reporting mode ADC function, the ADC function in the user profile configuration document of the UE is available and the support feature cell provided by the V-PCRF indicates that the visited network supports the solicited application reporting ADC function, then the H-PCRF indicates in the support feature cell carried in the acknowledgement message that the home network supports the solicited application reporting ADC function, and provides an ADC rule to the V-PCRF through an S9 interface, where the returned message carries the ADC rule.

Step S207: The V-PCRF stores the PCC rule and the ADC rule, and forwards an H-PCRF authorization rule according to a roaming protocol and a local policy. The V-PCRF issues a response message to the PCEF, and forwards the PCC rule to the PCEF. If necessary, the V-PCRF also generates a QoS rule to the BBERF and forwards the ADC rule to the PCEF.

Step S208: The V-PCRF forwards the PCC rule authorized and issued by the H-PCRF to the PCEF. If the PCEF has enhanced the ADC function and is in the solicited mode, then the PCEF forwards the ADC rule to the PCEF at the same time.

Step S209: The PCEF installs and enforces relevant policies, such as the PCC rule, the ADC rules, and the event trigger. The gateway where the PCEF is located returns a response to establish an IP-CAN session and carry an assigned IP address.

Embodiment 2

When a roaming UE accesses a visited network from a visited location and both the H-PCRF and the V-PCRF support the ADC function, a support feature cell is used to describe its supported functions at an S9 interface. For example, for the ADC function, when a visited network supports the solicited application reporting ADC function, the ADC rule generated by the H-PCRF will be transferred to the V-PCRF through the S9 interface, and the V-PCRF will forward the ADC rule to a TDF for installation and enforcement. The corresponding application detection and control information generated during the subsequent detection process will also be transferred back to the H-PCRF via V-PCRF through the S9 interface.

Figure 4:
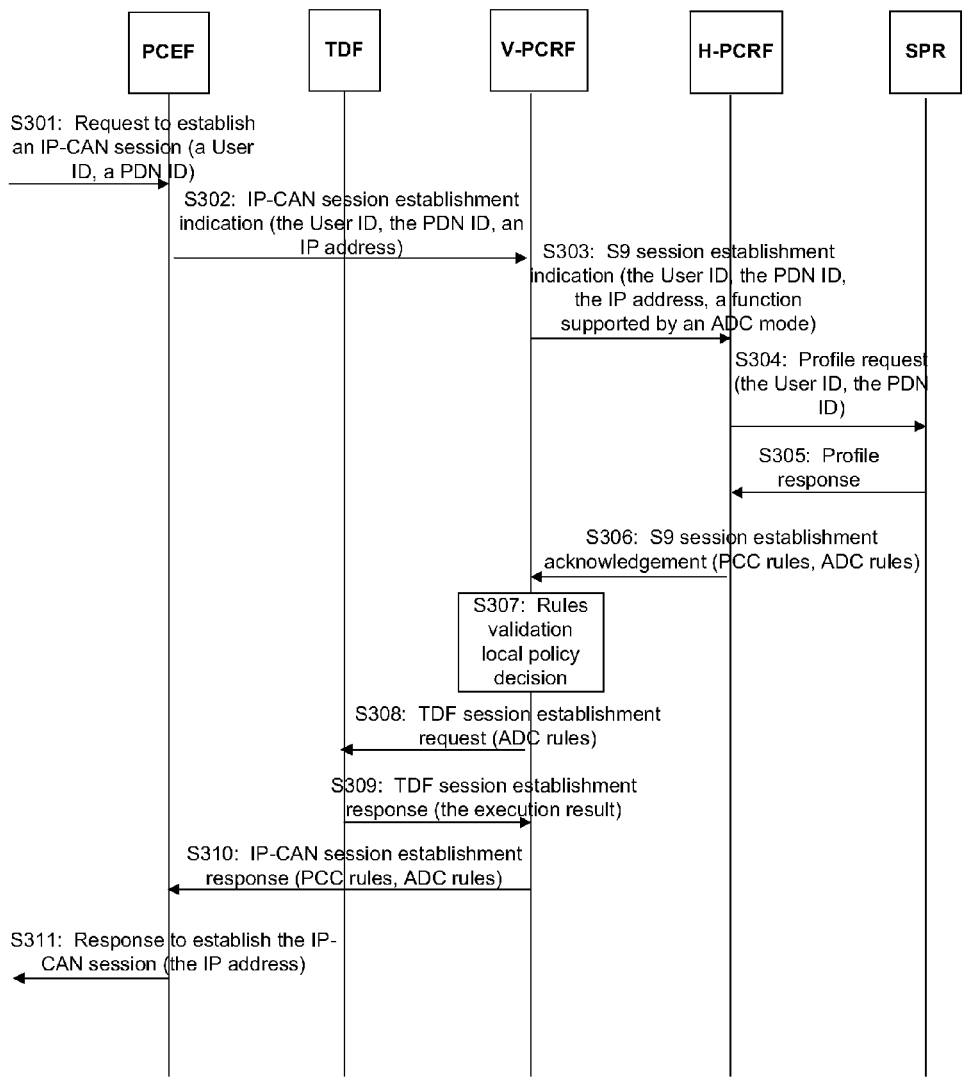
FIG. 4 is a flowchart in accordance with a second embodiment of the disclosure: a process for creating an S9 session when it roams into visited access, with independent TDF deployment under a solicited ADC mode.

FIG. 4 is a flowchart according to a second embodiment of the disclosure. Here, a roaming UE is in the visited access mode, no S9 session has been established between the visited and roaming places, a network supports an independent TDF, and the solicited report ADC function mode is adopted. As shown in FIG. 4, the specific description of the process is as follows:

Step S301: During the process that the UE requests to establish an IP-CAN session, a gateway where the PCEF is located receives an IP-CAN session establishment request message, and carries the user ID and the PDN ID of a PDN network requesting to be accessed in the IP-CAN session establishment request message.

Step S302: The PCEF sends an IP-CAN session establishment indication message to the V-PCRF, and carries the user ID, the PDN ID and an IP Address allocated to the UE in the IP-CAN session establishment indication message. The PCEF may also carry TDF routing information. Moreover, the PCEF carries the value of ADC in a supported feature cell to indicate the V-PCRF that the PCEF supports the application detection function. In general, the PCEF only supports the solicited application reporting mode.

Step S303: The V-PCRF determines, according to the user ID, that the user is a roaming user. If the V-PCRF has not yet established any S9 session for the user, then the V-PCRF sends a request message, which may be a Credit Control Request (CCR) message, to the H-PCRF to establish an S9 session, and at the same time also requests to establish an S9 sub-session, in which the V-PCRF carries profile information of the user, the PDN ID, the IP address and the like. If the TDF deployed in the visited network supports the solicited application reporting mode, then the V-PCRF carries a value indicating the solicited application reporting ADC function in the support feature carried in the request message. Here, the V-PCRF may learn according to configuration that the TDF deployed in the network supports the solicited application reporting ADC function mode. The V-PCRF is intended to inform the H-PCRF of the type of the ADC function mode supported by the visited network, where the specific method is not restricted in the disclosure.

Step S304: The H-PCRF determines, according to the user ID, that there is still no profile data of the user, and the H-PCRF sends a profile request to an SPR, and carries the user ID and the PDN ID in the profile request.

Step S305: The SPR returns the user profile information, i.e., profile response according to the user ID and the PDN ID.

At this moment, if the home SPR has not yet provided the H-PCRF with any user profile configuration document, then the home SPR will provide the H-PCRF with a user profile configuration document to inform the H-PCRF about whether the ADC function of the user is contracted and available. Alternatively, the H-PCRF will interact with the SPR upon startup of the equipment to acquire the user profile configuration document.

Step S306: The H-PCRF formulates, according to the returned user profile information, network policy, access information of the UE and the like, a policy which includes a PCC rule, an event trigger and usage monitoring, and the H-PCRF returns the formulated policy to the V-PCRF.

If the H-PCRF supports the solicited application reporting ADC function mode, the ADC function in the user profile configuration document of the UE is available and the support feature cell provided by the V-PCRF indicates that the visited network supports the solicited application reporting ADC function, then the H-PCRF indicates in the support feature cell carried in the acknowledgement message that the home network supports the solicited application reporting ADC function, and provides an ADC rule to the V-PCRF through an S9 interface, where the returned message carries the ADC rule.

Step S307: The V-PCRF stores the PCC rule and the ADC rule, and forwards an H-PCRF authorization rule according to a roaming protocol and a local policy. The V-PCRF issues a response message to the PCEF, and forwards the PCC rule to the PCEF. If necessary, the V-PCRF also generates a QoS rule to the BBERF. The ADC rule is forwarded to the PCEF in Step S308.

Step S308: To request an independent TDF of mode, the V-PCRF issues the ADC rule to the TDF to establish an ADC session.

Step S309: The TDF installs and enforces the ADC rule, and returns a response message carrying the enforcement result to the V-PCRF.

Step S310: The V-PCRF forwards the PCC rule authorized and issued by the H-PCRF to the PCEF.

Step S311: the PCEF installs and enforces relevant policies, such as the PCC rule and the event trigger. The gateway where the PCEF is located returns a response to establish an IP-CAN session and carry an assigned IP address.

Embodiment 3

When a roaming UE accesses a visited network from a visited location and both the H-PCRF, the V-PCRF support the ADC function and the V-PCRF supports the unsolicited application reporting ADC function mode, the H-PCRF does not need to generate and transfer any ADC rule to an HPLMN, no ADC rule is transferred over an S9 interface, and the V-PCRF receives detection information of the TDF, and then transfers the detection information to H-PCRF through the S9 interface.

Figure 5:
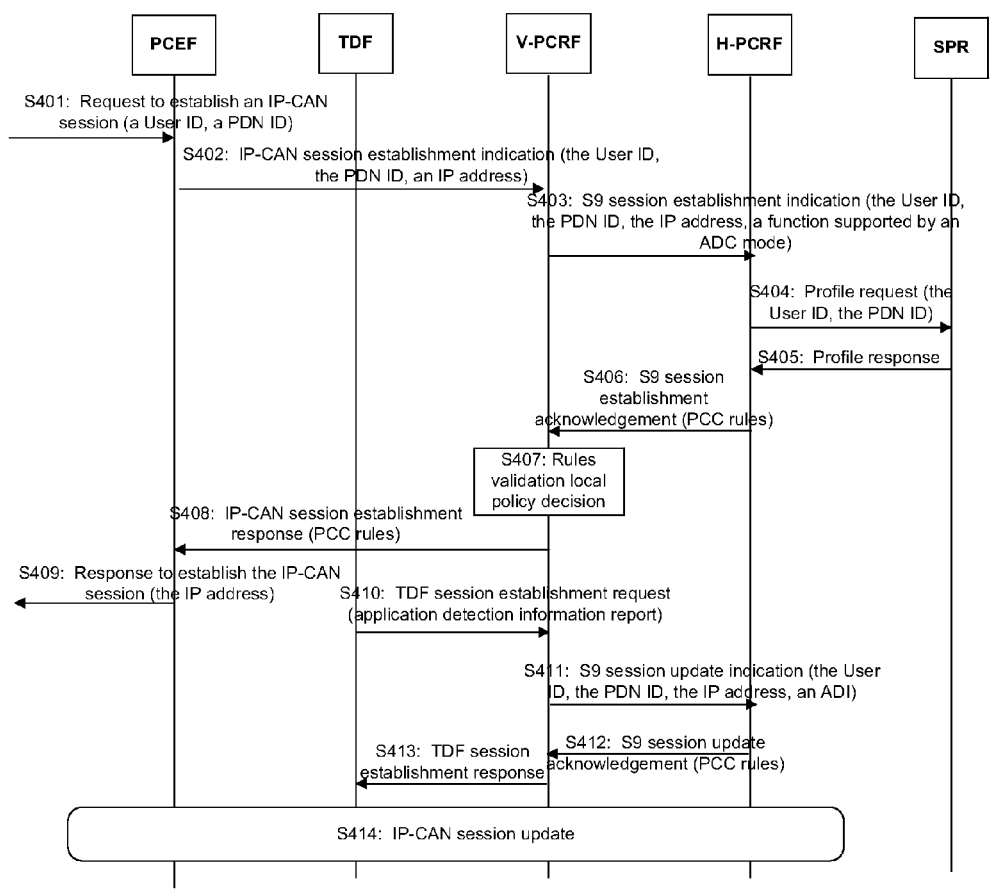
FIG. 5 is a flowchart in accordance with a third embodiment of the disclosure: a process for creating and updating an S9 session when it roams into visited access, with independent TDF deployment under an unsolicited ADC mode.

FIG. 5 is a flowchart according to a third embodiment of the disclosure. Here, a roaming UE is in the visited access mode, no S9 session has been established between the visited and roaming places, an independent TDF function of unsolicited application reporting is supported, and the V-PCRF supports the ADC function. As shown in FIG. 5, the specific description of the process is as follows:

Step S401 to Step S405 are consistent with Step S301 to Step S305, and the only difference is that in Step S403, if the TDF deployed in the visited network supports the unsolicited application reporting ADC function mode, then the support feature in the S9 session creation request message that the V-PCRF sends to the H-PCRF will indicate that it supports the unsolicited application reporting ADC function mode. Here, the V-PCRF may learn according to configuration that the TDF deployed in the network supports the unsolicited application reporting mode.

Step S406: The H-PCRF formulates, according to the returned user profile information, network policy, access information of the UE and the like, a policy which includes a PCC rule, an event trigger and usage monitoring, and the H-PCRF returns the formulated policy to the V-PCRF.

If the H-PCRF supports the unsolicited application reporting ADC function mode, the ADC function in the user profile of the UE is available and the support feature provided by the V-PCRF indicates that the unsolicited application reporting ADC function is supported, then the H-PCRF indicates in the support feature cell carried in the acknowledgement message that the home network supports the solicited application reporting ADC function, and the H-PCRF will not generate and provide any ADC rule to the V-PCRF, where the returned message does not carry any ADC rule.

Step S407: The V-PCRF stores The PCC rule, and forwards an H-PCRF authorization rule according to a roaming protocol and a local policy. The V-PCRF issues a response message to the PCEF, and forwards the PCC rule to the PCEF. If necessary, the V-PCRF generates a QoS rule to a BBERF.

Step S408: The V-PCRF forwards the PCC rule authorized and issued by the H-PCRF to the PCEF.

Step S409: The PCEF installs and enforces relevant policies, such as the PCC rules and the event trigger. The gateway where the PCEF is located returns a response to establish an IP-CAN session and carry an assigned IP address.

Step S410: A corresponding application defined by a preconfigured ADC rule in the TDF is detected, and the TDF sends a CCR message to the V-PCRF to report application detection information. If this is the first time that the IP-CAN session corresponding to the UE reports application detection information, then a TDF session is created at the same time.

Step S411: The V-PCRF will send to the H-PCRF the CCR message, the request type of which is set to update request, the V-PCRF updates the S9 session, and the V-PCRF notifies the H-PCRF of the application detection information.

Step S412: The H-PCRF updates the policy and relevant rules after receiving the application detection information, issues a CCA response message to the V-PCRF, with carrying the updated relevant rules.

Step S413: The V-PCRF sends a CCA message to the TDF.

Step S414: The H-PCRF initiates an IP-CAN session update process according to the application detection information, and the specific processing is identical to the prior art.

Embodiment 4

According to the above process, the disclosure also provides a system for identifying an ADC mode. The system includes:

a notification module, which is located in a Visited Policy and Charging Rules Function (V-PCRF), and is configured to inform a Home Policy and Charging Rules Function (H-PCRF) of an ADC function mode supported by a visited network when an S9 session is created, wherein the ADC function mode is a solicited application reporting mode or an unsolicited application reporting mode; and an identification response module, which is located in the H-PCRF and is configured to determine, in accordance with the ADC function mode supported by the visited network, whether to provide an ADC rule to the visited network.

Corresponding to the application scenario of the first embodiment, when the visited network supports the solicited application reporting ADC function mode, the notification module informs, through an S9 session establishment indication message, the H-PCRF that the visited network supports the solicited application reporting ADC function mode; and the identification response module sends, through an S9 session establishment acknowledgement message, the ADC rule to the V-PCRF.

Corresponding to the application scenario of the first embodiment, the system also includes:

a forwarding module, which is located in the V-PCRF, and is configured to forward the ADC rule to a PCEF) or a TDF after the notification module provides the ADC rule to the V-PCRF.

Corresponding to the application scenario of the third embodiment, when the visited network supports the unsolicited application reporting ADC function mode, the notification module informs, through an S9 session establishment indication message, the H-PCRF that the visited network supports the unsolicited application reporting ADC function mode; and the H-PCRF does not carry any ADC rule in the S9 session establishment acknowledgement message.

A system for identifying ADC modes is also provided in the disclosure. The system includes:

a V-PCRF, which is configured to, when the V-PCRF creates an S9 session, inform a Home Policy and Charging Rules Function (H-PCRF) of an ADC function mode supported by a visited network, wherein the ADC function mode is a solicited application reporting mode or an unsolicited application reporting mode; and the H-PCRF, which is configured to determine, in accordance with the ADC function mode supported by the visited network, whether to provide an ADC rule to the visited network.

Corresponding to the application scenario of the first embodiment, when the visited network supports the solicited application reporting ADC function mode, the V-PCRF is configured to inform, through an S9 session establishment indication message, the H-PCRF that the visited network supports the solicited application reporting ADC function mode; and the H-PCRF is configured to send, through an S9 session establishment acknowledgement message, the ADC rule to the V-PCRF.

Corresponding to the application scenario of the first embodiment, the V-PCRF is further configured to forward the ADC rule to a PCEF or a TDF.

Corresponding to the application scenario of the third embodiment, when the visited network supports the unsolicited application reporting ADC function mode, the V-PCRF is configured to inform, through an S9 session establishment indication message, the H-PCRF that the visited network supports the unsolicited application reporting ADC function mode; and the H-PCRF is configured to send an S9 session establishment acknowledgement message including no ADC rule to the V-PCRF.

The disclosure further discloses a V-PCRF, which is the V-PCRF mentioned above.

The disclosure further discloses an H-PCRF, which is the H-PCRF mentioned above.

The foregoing embodiment mainly describes the scenario where the home place and the visited place each supports a mode. The problem about correctly distinguishing the ADC mode of the visited place by the H-PCRF solved by the disclosure is also applicable to the scenario of the hybrid mode where the visited place or the home place supports two modes simultaneously. When a session is created, the V-PCRF informs the H-PCRF of the mode supported by the V-PCRF. The mode may be the solicited mode or the unsolicited mode, or a third mixed mode where two modes are supported simultaneously. Alternatively, the V-PCRF informs the H-PCRF of two modes supported by the V-PCRF and priorities thereof. The H-PCRF may determine, according to its own supported mode, the profile mode of the UE and a local policy such as service characteristics, the mode supported by the S9 session.

The foregoing embodiment is mainly designed for the scenario where the same user supports the same report mode. The disclosure is also applicable to the scenario where different services/applications of the same user support different ADC report modes. Different from the mode negotiation of the S9 session mentioned above, for the scenario where different services/applications of the user support different ADC report modes, two kinds of function mode negotiations of the H-PCRF and the V-PCRF are performed in an S9 subsession, in which the ADC mode corresponds to the IP-CAN.

The foregoing embodiment is mainly designed for the scenario where PCEF supports the solicited application reporting mode and the TDF supports both solicited and unsolicited application reporting modes. Generally, the PCEF only supports the solicited application reporting mode. However, the disclosure is also applicable to the ADC function scenario where the PCEF supports the unsolicited application reporting mode.

The above are only the preferred embodiments of the disclosure, but are intended to restrict the disclosure. The disclosure may also have many other embodiments. Those skilled in the art can make various modifications and variations to the disclosure without departing from the spirit and essence of the disclosure. However, all such modifications and variations shall fall within the scope of protection of the claims attached hereof.

Obviously, those skilled in the art should understand that the individual modules or individual steps in the disclosure as mentioned above may be implemented by using a general-purpose computing device, that they may be either integrated in a single computing device or distributed over a network comprised of multiple computing devices and that, optionally, they may be implemented by using program codes executable by such a computing device so that they may be stored inside a storage device and executed by a computing device. And, in some cases, the steps shown or described may be executed in a different order different from that mentioned here, or they may be made into individual integrated circuit modules respectively, or they may be implemented by making multiple modules or steps in them into individual integrated circuit modules. In this way, the disclosure is not restricted to any specific combination of hardware and software.

The invention claimed is:

1. A method for identifying an Application Detection Control (ADC) function mode, the method being applicable to a scenario where a roaming UE accesses a visited network from a visited location, the method comprising:

when a Visit Policy and Charging Rules Function (V-PCRF) creates an S9 session, informing, by the V-PCRF, a Home Policy and Charging Rules Function (H-PCRF) of an ADC function mode supported by the visited network; and determining, by the H-PCRF, whether to provide an ADC rule to the visited network in accordance with the ADC function mode supported by the visited network, wherein the ADC function mode is one of a solicited application reporting mode and an unsolicited application reporting mode;

wherein when the visited network supports the solicited application reporting mode, (i) informing, by the V-PCRF, through an S9 session establishment indication message the H-PCRF that the visited network supports the solicited application reporting ADC function mode; and (ii) sending, by the H-PCRF, the ADC rule to the V-PCRF through an S9 session establishment acknowledgement message; and wherein when the visited network supports the unsolicited application reporting mode, (i) informing, by the V-PCRF, through an S9 session establishment indication message the H-PCRF that the visited network supports the unsolicited application reporting ADC function; and (ii) sending, by the H-PCRF, an S9 session establishment acknowledgement message including no ADC rule to the V-PCRF.

2. The method according to claim 1, further comprising: after the H-PCRF provides the ADC rule to the V-PCRF, forwarding, by the V-PCRF, the ADC rule to a Policy and Control Enforcement Function (PCEF) or a Traffic Detection Function (TDF).

3. A system for identifying an Application Detection Control (ADC) function mode, comprising:
a notification circuitry, which is located in a Visit Policy and Charging Rules Function (V-PCRF), and is configured to inform a Home Policy and Charging Rules Function (H-PCRF) of an ADC function mode supported by a visited network when an S9 session is created; and an identification response circuitry, which is located in the H-PCRF and is configured to determine, in accordance with the ADC function mode supported by the visited network, whether to provide an ADC rule to the visited network, wherein the ADC function mode is one of a solicited application reporting mode and an unsolicited application reporting mode;

wherein when the visited network supports the solicited application reporting mode, (i) the notification circuitry is configured to inform, through an S9 session establishment indication message, the H-PCRF that the visited network supports the solicited application reporting ADC function mode; and (ii) the identification response circuitry is configured to send, through an S9 session establishment acknowledgement message, the ADC rule to the V-PCRF; and wherein when the visited network supports the unsolicited application reporting mode, (i) the notification circuitry is configured to inform, through an S9 session establishment indication message, the H-PCRF that the visited network supports the unsolicited application reporting ADC function mode; and (ii) the identification response circuitry is configured to send an S9 session establishment acknowledgement message including no ADC rule to the V-PCRF.

4. The system according to claim 3, further comprising: a forwarding circuitry, which is located in the V-PCRF, and is configured to forward the ADC rule to a Policy and Control Enforcement Function (PCEF) or a Traffic Detection Function (TDF) after the notification circuitry provides the ADC rule to the V-PCRF.

5. A Visit Policy and Charging Rules Function (V-PCRF) comprising:

a processor; and
a memory for storing instructions executable by the processor,
wherein the processor is configured to, when the V-PCRF creates an S9 session, inform a Home Policy and Charging Rules Function (H-PCRF) of an Application Detection Control (ADC) function mode supported by a visited network, wherein the ADC function mode is one of a solicited application reporting mode and an unsolicited application reporting mode;

wherein when the visited network supports the solicited application reporting mode, (i) inform, by the V-PCRF, through an S9 session establishment indication message the H-PCRF that the visited network supports the solicited application reporting ADC function mode; and (ii) send, by the H-PCRF, the ADC rule to the V-PCRF through an S9 session establishment acknowledgement message; and wherein when the visited network supports the unsolicited application reporting mode, (i) inform, by the V-PCRF, through an S9 session establishment indication message the H-PCRF that the visited network supports the unsolicited application reporting ADC function; and (ii) send, by the H-PCRF, an S9 session establishment acknowledgement message including no ADC rule to the V-PCRF.

6. The Visit Policy and Charging Rules Function (V-PCRF) according to claim 5, wherein the V-PCRF is further configured to forward the ADC rule to a Policy and Control Enforcement Function (PCEF) or a Traffic Detection Function (TDF).

7. A Home Policy and Charging Rules Function (H-PCRF) comprising:
a processor; and
a memory for storing instructions executable by the processor,
wherein the processor is configured to determine, in accordance with an Application Detection Control (ADC) function mode supported by a visited network, whether to provide an ADC rule to the visited network: wherein the ADC function mode is one of a solicited application reporting mode and an unsolicited application reporting mode;

wherein when the visited network supports the solicited application reporting mode, (i) inform, by a Visit Policy and Charging Rules Function (V-PCRF), through an S9 session establishment indication message the H-PCRF that the visited network supports the solicited application reporting ADC function mode; and (ii) send, by the H-PCRF, the ADC rule to the V-PCRF through an S9 session establishment acknowledgement message; and wherein when the visited network supports the unsolicited application reporting mode, (i) inform, by the V-PCRF, through an S9 session establishment indication message the H-PCRF that the visited network supports the unsolicited application reporting ADC function; and (ii) send, by the H-PCRF, an S9 session establishment acknowledgement message including no ADC rule to the V-PCRF.

* * * * *